United States Patent
Drexl et al.

(10) Patent No.: US 10,583,499 B2
(45) Date of Patent: Mar. 10, 2020

(54) REVERSING MODE FOR CORE DRILLING SYSTEMS

(71) Applicant: Hilti Aktiengesellschaft, Schaan (LI)

(72) Inventors: Tobias Drexl, Weil (DE); Andreas Hartig, Augsburg (DE); Thomas Schmalholz, Kaufbeuren (DE); Bernhard Link, Schwabbruck (DE); Goran Golubovic, Buchloe (DE)

(73) Assignee: Hilti Aktiengesellschaft, Schaan (LI)

( * ) Notice: Subject to any disclaimer, the term of this patent is extended or adjusted under 35 U.S.C. 154(b) by 51 days.

(21) Appl. No.: 15/569,354

(22) PCT Filed: Apr. 22, 2016

(86) PCT No.: PCT/EP2016/059020
§ 371 (c)(1),
(2) Date: Oct. 25, 2017

(87) PCT Pub. No.: WO2016/173943
PCT Pub. Date: Nov. 3, 2016

(65) Prior Publication Data
US 2018/0297126 A1    Oct. 18, 2018

(30) Foreign Application Priority Data
Apr. 28, 2015   (EP) .................................... 15165313

(51) Int. Cl.
*B23B 51/04*     (2006.01)
*B28D 7/00*      (2006.01)
(Continued)

(52) U.S. Cl.
CPC .......... *B23B 51/0406* (2013.01); *B23B 35/00* (2013.01); *B23B 49/00* (2013.01);
(Continued)

(58) Field of Classification Search
CPC ..... B23B 51/0406; B23B 35/00; B23B 49/00; B23B 2226/75; B23B 2260/128; B23B 2270/32; B23B 2270/483; B23B 2270/486; B23B 2270/54; B23Q 5/20; B28D 1/041; B28D 7/005
See application file for complete search history.

(56) References Cited

U.S. PATENT DOCUMENTS 3,248,629 A * 4/1966 Reynolds ................. B23Q 5/36
                                              318/257
3,894,809 A * 7/1975 Hollins .................... B23Q 5/14
                                              408/128
(Continued)

FOREIGN PATENT DOCUMENTS

CN    102294499    12/2011
DE    102007053350   5/2009
(Continued)

OTHER PUBLICATIONS

International Search Report of PCT/EP2016/059020, 2 pages, dated Jun. 17, 2016.

*Primary Examiner* — Yong-Suk Ro
(74) *Attorney, Agent, or Firm* — Davidson, Davidson & Kappel, LLC

(57) ABSTRACT

A control method for the use of a core drilling system including a core drill and a feed device for driving the core drill along a machine holding device. The method includes the steps of determining the end of a core drilling operation on the basis of reaching a predetermined threshold value for at least one corresponding predefined drilling parameter; and of selecting a reversing mode for retracting a drilling tool out of a borehole at a reversing rotational speed which corresponds to a multiple of a predetermined tapping rotational speed of the drilling tool at the beginning of the core drilling operation.

15 Claims, 5 Drawing Sheets

(51) Int. Cl.
  *B23B 49/00*  (2006.01)
  *B28D 1/04*   (2006.01)
  *B23B 35/00*  (2006.01)
  *B23Q 5/20*   (2006.01)

(52) U.S. Cl.
  CPC .............. *B23Q 5/20* (2013.01); *B28D 1/041* (2013.01); *B28D 7/005* (2013.01); *B23B 2226/75* (2013.01); *B23B 2260/128* (2013.01); *B23B 2270/32* (2013.01); *B23B 2270/483* (2013.01); *B23B 2270/486* (2013.01); *B23B 2270/54* (2013.01)

(56) References Cited

U.S. PATENT DOCUMENTS

| | | | |
|---|---|---|---|
| 5,558,476 | A | 9/1996 | Uchida et al. |
| 5,628,594 | A * | 5/1997 | Fetty ................. B23Q 1/70 409/144 |
| 7,210,878 | B2 * | 5/2007 | Koslowski ............. B23B 39/00 173/176 |
| 8,257,002 | B2 | 9/2012 | Prust et al. |
| 2016/0031119 | A1 | 2/2016 | Taack-Trakranen |
| 2016/0151934 | A1 | 6/2016 | Pfeifer et al. |
| 2016/0200000 | A1 | 7/2016 | Koslowski et al. |

FOREIGN PATENT DOCUMENTS

| | | |
|---|---|---|
| DE | 102013205827 | 10/2014 |
| EP | 2835198 | 2/2015 |
| RU | 2059464 C1 | 10/1996 |
| SU | 739219 A1 | 5/1980 |
| WO | 2015007875 A1 | 1/2015 |

\* cited by examiner

REVERSING MODE FOR CORE DRILLING SYSTEMS

The present invention relates to a control method for the use of a core drilling system including a core drill and a feed device for driving the core drill along a machine holding device.

Moreover, the present invention relates to a feed device for driving a core drill along a machine holding device for the use of the method according to the present invention.

The present invention also relates to a core drill for the use of the method according to the present invention.

In addition, the present invention relates to a core drilling system including a core drill and a feed device for driving the core drill along a machine holding device for the use of the method according to the present invention.

BACKGROUND

The actual core drilling operation is usually completed when either a so-called breakthrough or a certain borehole depth in a material to be worked has been reached. The material to be worked is usually a mineral material such as, for example, concrete, brickwork, or similar materials.

A breakthrough means the material to be worked is cut or drilled through completely by a drilling tool designed as a drill bit. In this case, the material which has been cut away or cut out is located in the interior of the drill bit, in the form of a so-called drill core, and may be removed together with the drill bit from the borehole. When a certain borehole depth is to be reached, a cylindrical ring is merely cut into the material to be worked. In this case, there is no formation of a drill core which has been detached from the material and which may be removed together with the drill bit from the borehole. After the drilling operation, the drill core remains intact as a column in the borehole and must be separated from the rest of the material and removed from the borehole in a separate operation after removal of the drill bit.

After the core drilling operation for producing a cylindrical borehole has been completed, the water supply of the core drilling system which is necessary for cooling and flushing is usually shut off, the drive of the core drill is stopped, and the drill bit is withdrawn from the borehole which was produced.

SUMMARY OF THE INVENTION

The removal of the drill bit after completion of the drilling operation may be made substantially more difficult due to the fact that boreholes drilled with the aid of core drilling systems do not extend absolutely straight, drill bits run on the surface of the material to be worked, even at the beginning of the core drilling operation, i.e., are not correctly centered with respect to the subsequent borehole, or may bend during the core drilling operation, and individual pieces of rock or parts of rebar may be located in the borehole. It is even possible, due to the aforementioned conditions, that the drill bit and/or the core drill are/is damaged during the attempt to remove the drill bit from the borehole.

It is an object of the present invention to solve the above-described problems and, in particular, to provide a control method for the use of a core drilling system including a core drill and a feed device for driving the core drill along a machine holding device, with the aid of which the removal of the drill bit after completion of the drilling operation is improved. In addition, the object of the present invention is to provide a feed device for driving a core drill along a machine holding device, a core drill, and a core drilling system including a core drill and a feed device for driving the core drill along a machine holding device for the use of the method.

A control method is provided for the use of a core drilling system including a core drill and a feed device for driving the core drill along a machine holding device.

According to the present invention, the method includes the steps determining the end of a core drilling operation on the basis of reaching a predetermined threshold value for at least one corresponding predetermined drilling parameter; and selecting a reversing mode for returning a drilling tool from a borehole at a reversing rotational speed which corresponds to a multiple of a predetermined tapping rotational speed of the drilling tool at the beginning of the core drilling operation.

Given that the drilling tool is operated in the reversing mode at the appropriate reversing rotational speed, the drilling tool and the core drill are more robust and, therefore, less susceptible to damage resulting from unevenness or irregularities, a deformed drilling tool as well as pieces of rock or parts of rebar in the drilled borehole.

In order to achieve an optimal rotational speed for the drilling tool, it may be provided according to one advantageous specific embodiment of the present invention that the reversing rotational speed corresponds to a multiple of the tapping rotational speed. Alternatively thereto, according to yet another advantageous specific embodiment, the reversing rotational speed may correspond to a 3-fold to 4-fold multiple of the tapping rotational speed or to one-half the value of an idle rotational speed.

According to yet another specific embodiment of the present invention, it may be advantageous that the tapping rotational speed is dependent on the diameter of the drilling tool which is used.

According to one advantageous specific embodiment of the present invention, it may be useful that the drilling parameter corresponds to a rotational speed value of a drive of the core drill, a torque value which the drive generates and transmits to the drilling tool, or an amperage value of the drive.

According to yet another specific embodiment of the present invention, it may be advantageous that the predetermined threshold value corresponds to a predetermined percentage of the corresponding drilling parameter.

BRIEF DESCRIPTION OF THE DRAWINGS

The present invention is described in greater detail with respect to advantageous exemplary embodiments.

DETAILED DESCRIPTION

Device

Figure 1:
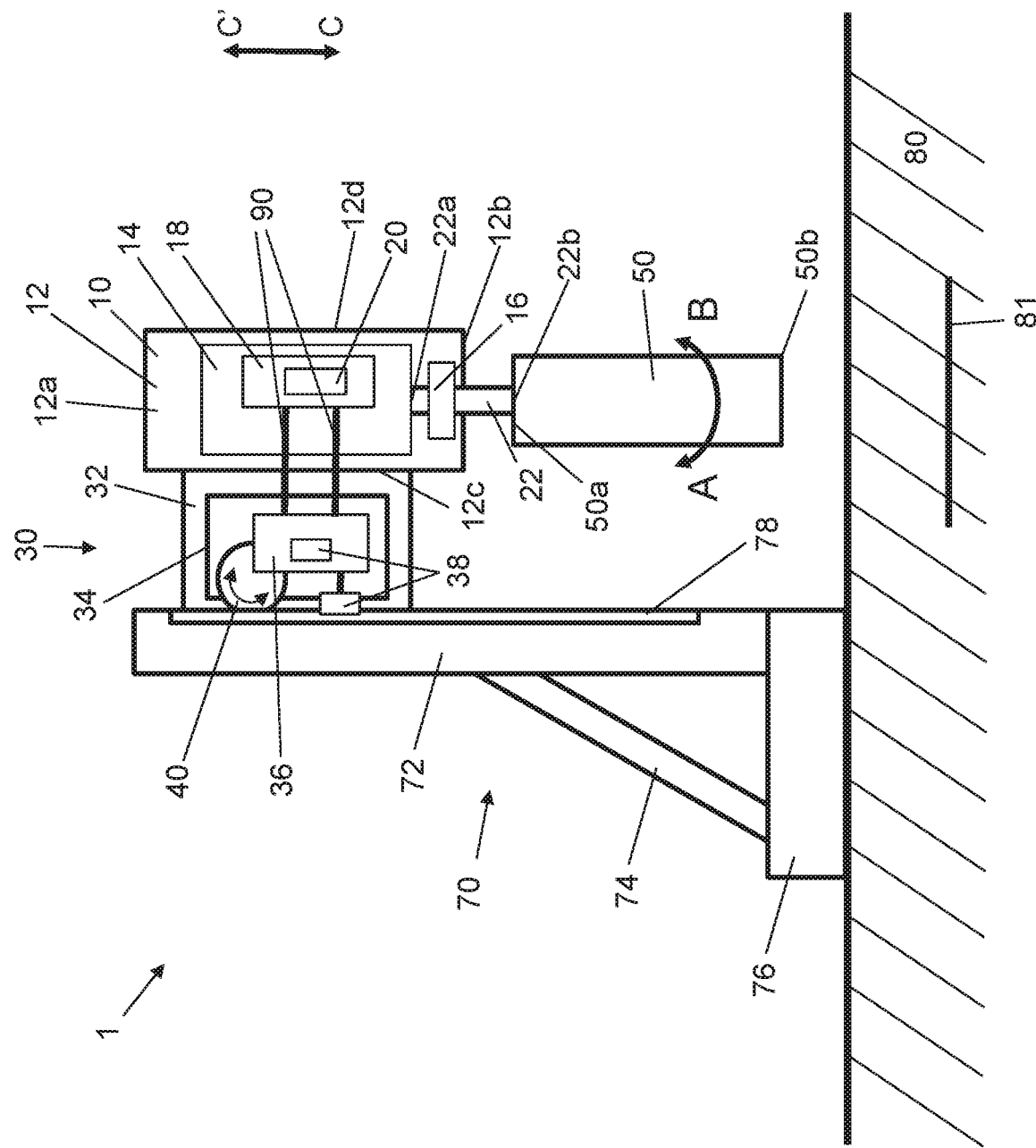
FIG. 1 shows a core drilling system according to the present invention, including a core drill, a feed device, and a machine holding device in a starting position.

FIG. 1 shows a core drilling system 1 as a combination of a power tool 10, a feed device 30, a drilling tool 50 in the form of a drill bit, and a machine holding device in the form of a machine stand 70.

Power tool 10 is designed in the form of a core drill and includes a housing 12, a drive 14, a gearbox 16, a first control unit 18, sensors 20, and a drive shaft 22. Drive 14 is designed in the form of an electric motor. Alternatively, any other suitable type of drive may also be selected.

According to one special specific embodiment of the present invention, drive 14 may be formed by a high frequency motor.

First control unit 18 is designed in such a way that it detects all parameters of power tool 10 and, in particular, all parameters of drive 14, which are measured by sensors 20 of power tool 10. These parameters include, for example, the engaged gear of gearbox 16, the rotational speed of electric motor 14, the torque generated by electric motor 14, the rotational speed of drilling tool 50, the applied and/or output power of electric motor 14, the applied amperage of electric motor 14, etc.

Housing 12 has a top side 12a, a lower side 12b, a left side 12c, and a right side 12d. Drive 14 is situated in the interior of housing 12.

Drive shaft 22 includes a first end 22a and a second end 22b. First end 22a of drive shaft 22 is connected to drive 14 in such a way that drive 14, which is designed as an electric motor, may set drive shaft 22 into a first rotary motion A or a second rotary motion B. Second end 22b of drive shaft 22 protrudes from core drill 10 on lower side 12b of housing 12. Moreover, drilling tool 50, in the form of a cylindrical drill bit, has a first end 50a and a second end 50b. First end 50a of drilling tool 50 is connected to second end 22b of drive shaft 22 in a rotatably fixed manner. Via drive shaft 22, power tool 10 may set drilling tool 50 into first rotary motion A or into second rotary motion B.

Feed device 30 includes a housing 32, in which a feed drive 34, a second control unit 36, sensors 38, and a drive pinion 40 are positioned. Second control unit 36 is designed in such a way that it detects all parameters of feed device 30 and, in particular, the parameters of feed drive 34, which are measured by sensors 38 of feed device 30. These measured parameters include, for example, the feed rate of feed device 30 with respect to machine stand 70 or workpiece 80, the distance already covered by feed device 30 since the beginning of the drilling operation as measured from a starting point to be defined (also referred to as zero point), the position of feed device 30 along machine stand 70, the rotation angle of feed drive 34, etc.

In addition, a plurality of parameters may be calculated by control unit 36 of feed device 30. The parameter calculation takes place in this case with the aid of a comparison between the parameters detected by sensors 38 such as, for example, the rotation angle of drive pinion 40, and the predefined (i.e., preset) parameters. On the basis of the parameter calculation it is possible to ascertain, inter alia, the feed rate of feed device 30 with respect to machine stand 70, the relative and/or absolute position of feed device 30, the distance already covered by feed device 30 since the beginning of the drilling operation, and the point in time and/or the distance until the stop of drilling tool 50 is reached.

As shown in FIG. 1, feed drive 34 is designed in the form of an electric motor in this case, according to a first embodiment.

Under the control of control unit 36, feed drive 34 drives drive pinion 40 and, therefore, feed device 30 relative to machine stand 70.

Feed device 30 is designed in such a way that it may be mounted on machine stand 70 (as described in the following) and may be moved, with the aid of drive pinion 40, along machine stand 70 in arrow direction C. Sensors 38 are designed in the form of angle sensors, rotation angle sensors, acceleration sensors, speed sensors, or position sensors, and are designed in such a way, in this case, that they detect the acceleration, the feed rate, the angle, the rotation angle, and the position of feed device 30 either incrementally directly at feed drive 34 or absolutely along machine stand 70.

Machine stand 70 includes a guide rail 72, a bracing element 74, and a base plate 76. Guide rail 72 is positioned on base plate 76 and is supported by bracing element 74 in such a way that guide rail 72 is oriented vertically or at the predefined angle. Moreover, guide rail 72 includes a toothed rack 78 on one side. Bracing element 74 is optional in this case and, according to an alternative specific embodiment of the machine stand, may also be dispensed with.

As is also shown in FIG. 1, housing 12 of power tool 10 is fastened on housing 32 of feed device 30.

Feed device 30 is mounted on machine stand 70 in such a way that drive pinion 40 of feed device 30 engages into toothed rack 78 of machine stand 70. When drive pinion 40 is set into a rotary motion under the control of control unit 36 of feed drive 34, feed device 30 reversibly moves along machine stand 70 in arrow direction C or C'. Due to the fact that power tool 10 is fastened on feed device 30, the movement of feed device 30 along machine stand 70 in arrow direction C also causes power tool 10 to move along machine stand 70 in arrow direction C. By way of this vertical movement of power tool 10, drilling tool 50, which is designed in the form of the cylindrical drill bit and is fastened on power tool 10, is moved vertically into workpiece 80 to be worked, i.e., into the substrate, whereby a hole is drilled into workpiece 80. Material 80 is in the form of a mineral material in this case, in particular in the form of concrete including rebar 81.

Figure 3:
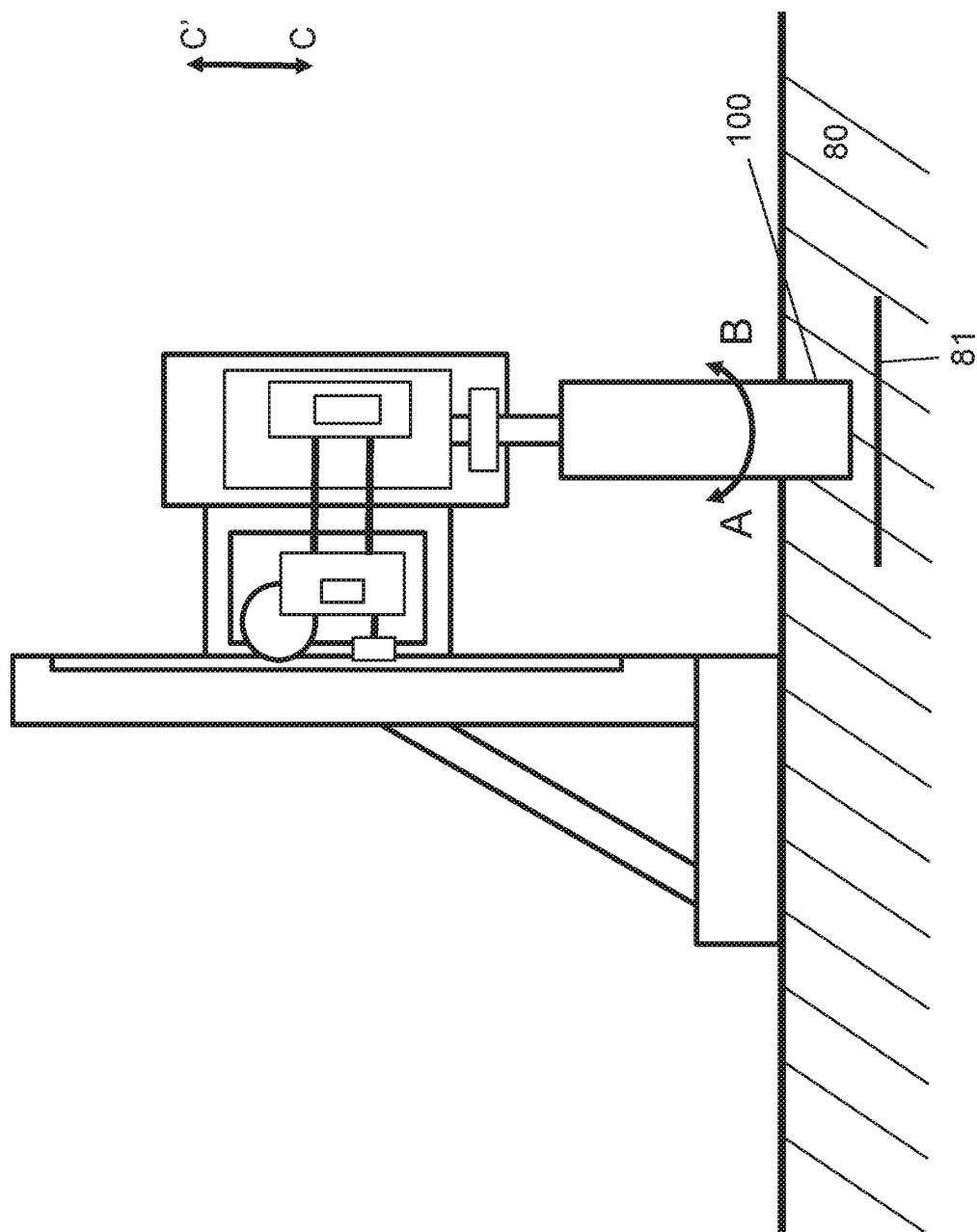
FIG. 3 shows the core drilling system according to the present invention, including the core drill, the feed device, and the machine holding device, with a drill bit in the mineral material.

As described above, particular sensors 38 of feed device 30 measure the parameters of feed device 30. In addition, particular sensors 38 of power tool 10 measure the parameters of power tool 10. As shown in FIG. 3, feed device 30 and power tool 10 are connected to each other with the aid of connection elements 90 in such a way that all detectable parameters of feed device 30 may be transmitted to power tool 10 and all detectable parameters of power tool 10 may be transmitted to feed device 30. Therefore, there is bidirectional communication between feed device 30 and power tool 10. Due to this bidirectional communication, it is possible, inter alia, that feed device 30 may be started and set into operation with the aid of a start switch (not shown) on power tool 10.

In addition, it is possible, in particular, that the information flow, i.e., the bidirectional transmission of the parameters, between feed device 30 and power tool 10 takes place with the aid of a power cable. According to one advantageous embodiment, the bidirectional transmission of the parameters may take place from the power cable via power tool 10 to feed device 30.

Drilling Operation

As described above, a core drilling system 1 is schematically represented in FIGS. 1 through 5 and a core drilling operation for producing a borehole 100 in a mineral material 80 is illustrated with the aid of individual method steps.

In FIG. 1, core drilling system 1 is represented at the beginning of a core drilling operation. For this purpose, drill bit 50 is located above material 80, in direction C'. In this case, core drilling system 1 is operated in a tapping mode. In the spot drilling mode, drive 14 operates drill bit 50 at a predetermined tapping rotational speed for rotation in direction of rotation A or B. The tapping rotational speed is dependent on the diameter of drill bit 50 used for the particular drilling operation.

Figure 2:
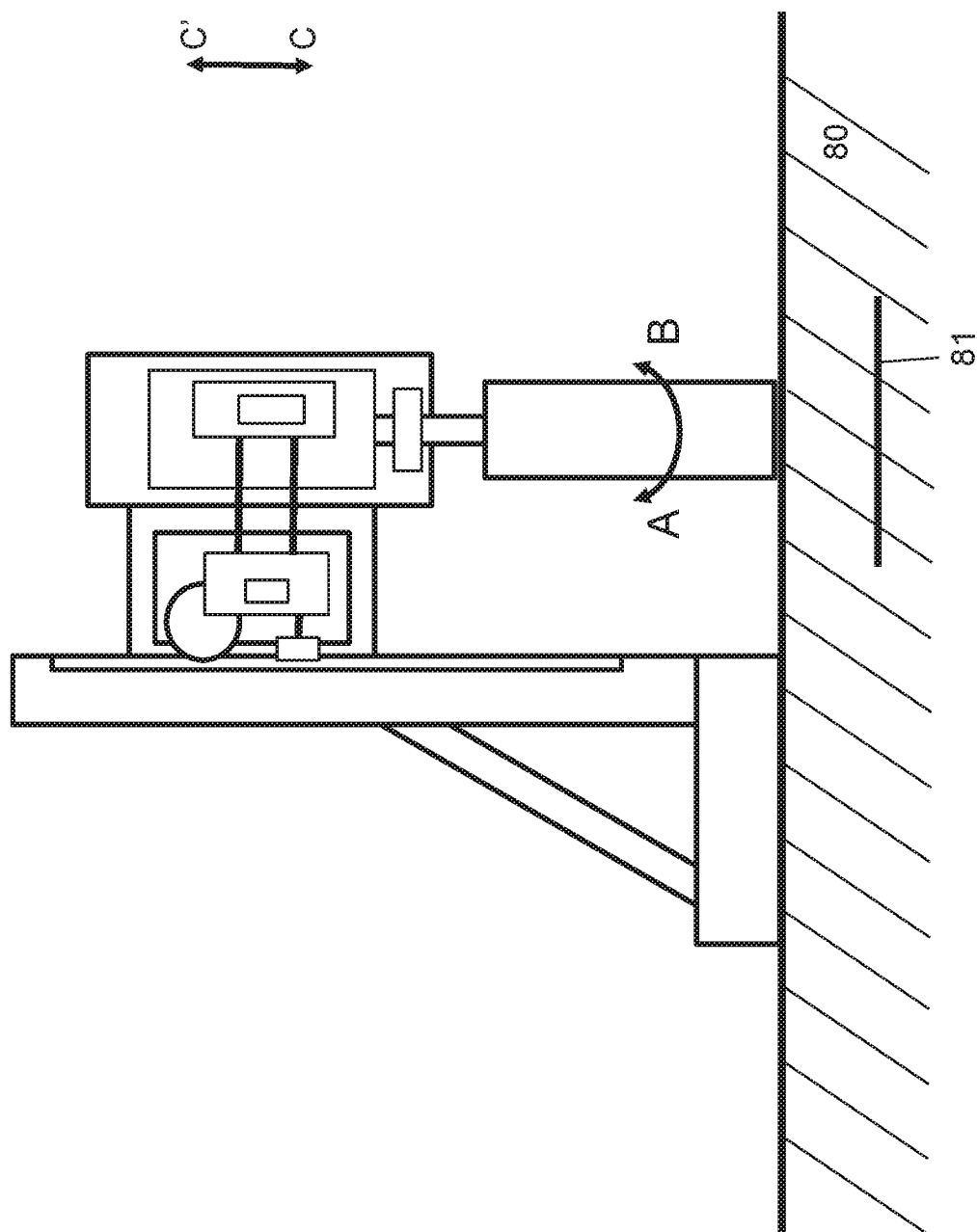
FIG. 2 shows the core drilling system according to the present invention, including the core drill, the feed device, and the machine holding device at the beginning of the core drilling operation in a mineral material.

As shown in FIG. 2, drill bit 50, which is rotating in the tapping mode at the tapping rotational speed, is subsequently moved with the aid of feed device 30 in direction C toward material 80. When second end 50b of drill bit 50 comes into contact with material 80, drill bit 50, in particular the cutting segments (not shown) of drill bit 50, begins to cut into material 80 and produce a borehole 100.

After a tapping of material 80 has been completed, i.e., a depth of approximately 20 mm has been cut into material 80 in direction C with the aid of drill bit 50, the remainder of the drilling operation for completing borehole 100 begins. For this purpose, core drilling system 1 is switched from the tapping mode into the drilling mode. For this purpose, the rotational speed of drill bit 50 is increased from the relatively low tapping rotational speed of the tapping mode to the drilling speed of the drilling mode. Drill bit 50 is rotated at this drilling speed of the drilling mode and is advanced in direction C by feed device 30 until borehole 100 has been completed.

Figure 4:
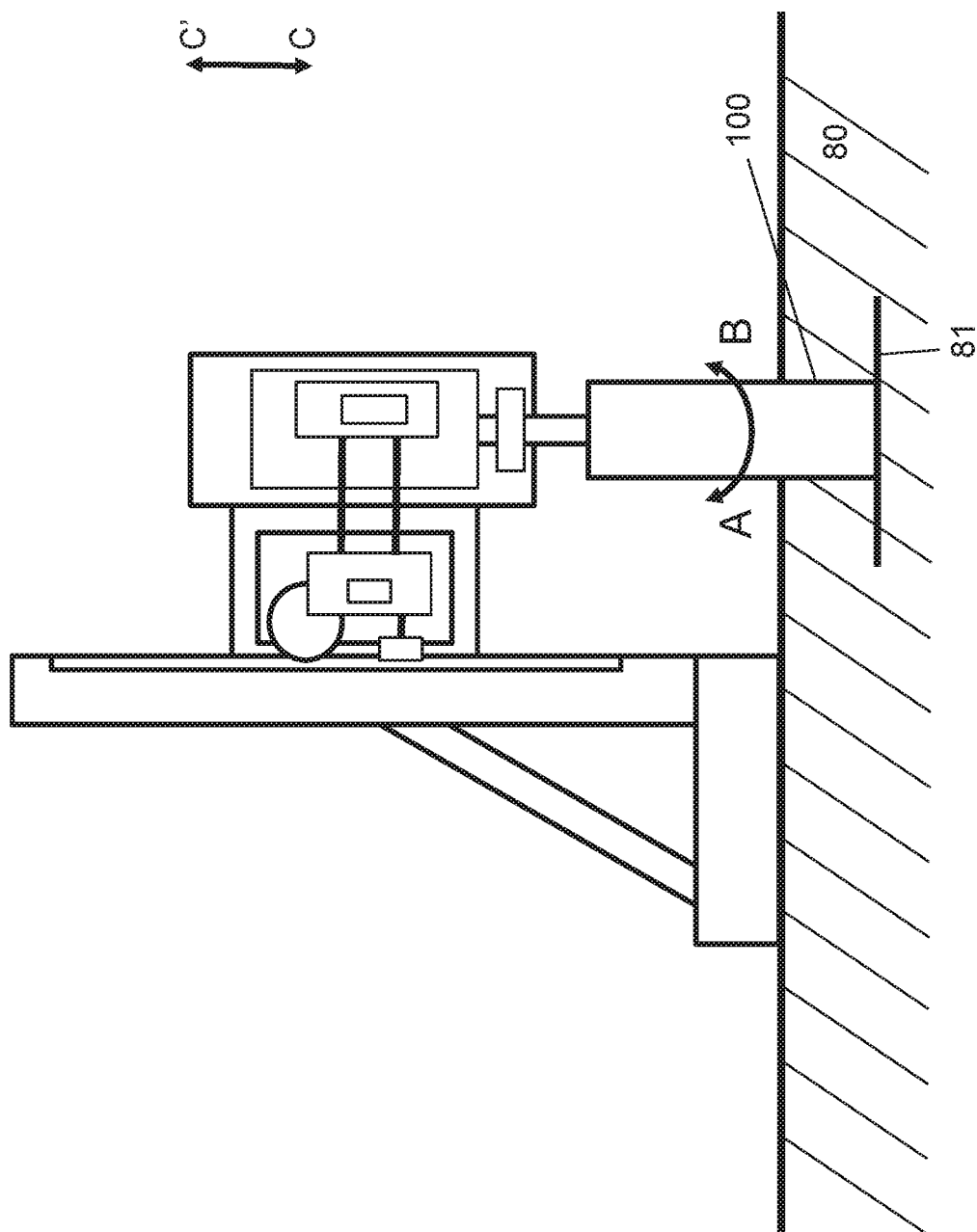
FIG. 4 shows the core drilling system according to the present invention, including the core drill, the feed device, and the machine holding device, with the drill bit during an impact on rebar in the mineral material.
Figure 5:
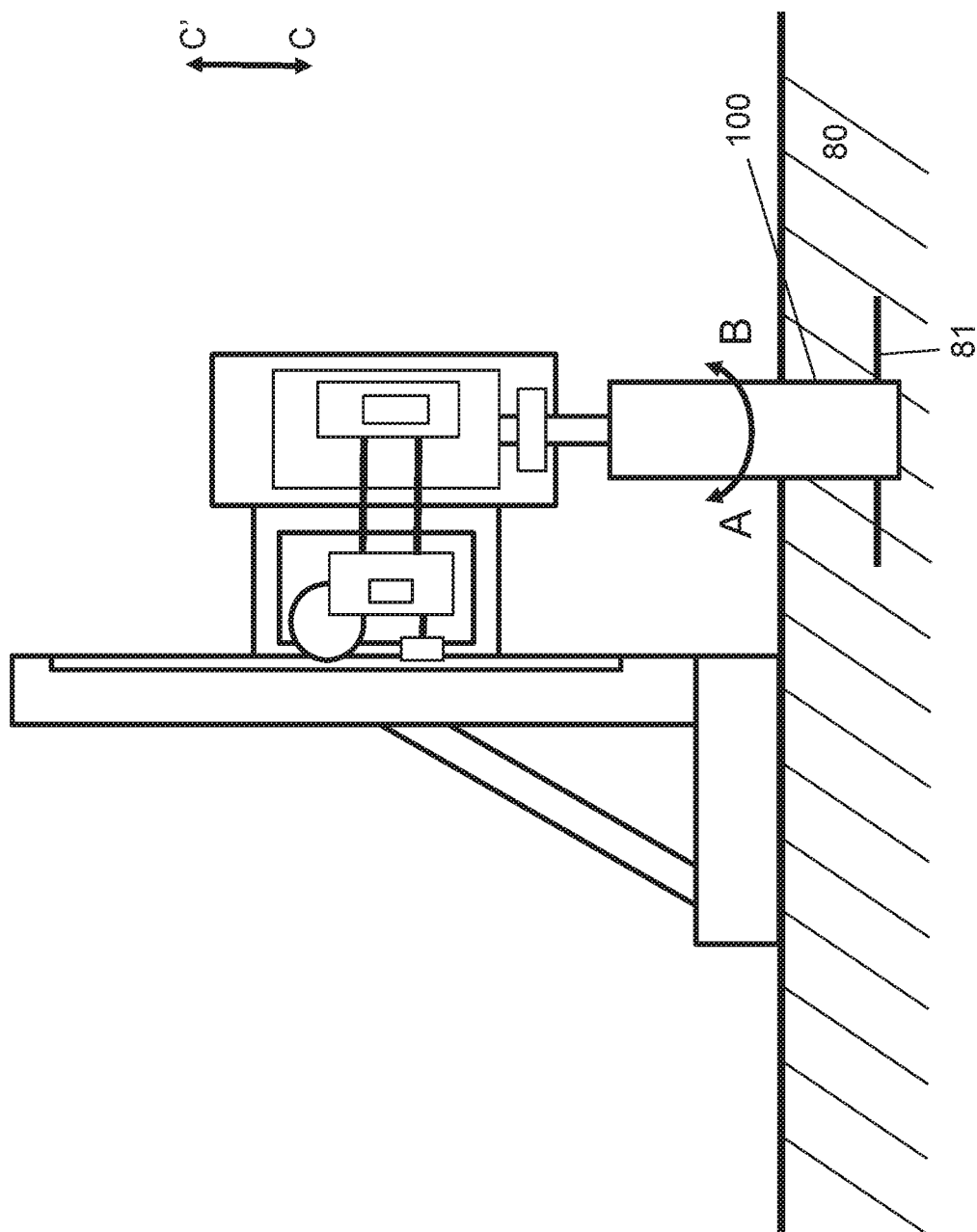
FIG. 5 shows the core drilling system according to the present invention, including the core drill, the feed device, and the machine holding device, with the drill bit after cutting a piece of rebar in the mineral material.

If drill bit 50 impacts rebar 81 present in mineral material 80, as shown in FIG. 4, this is detected by core drilling system 1 on the basis of changing drilling parameters. Consequently, core drilling system 1 is switched from the drilling mode into a rebar mode (so-called "iron boost"). In the rebar mode, predetermined drilling parameters of core drilling system 1 are changed or adapted to the changed conditions occurring during the cutting of a piece of rebar. In this way, for example, the drilling rotational speed is reduced to a rebar rotational speed and the torque generated by drive 14 and transmitted to drill bit 50 is increased. A piece of rebar may be cut more rapidly and efficiently by way of the drilling parameters which have been adjusted to predetermined values for the rebar mode. Overall, the entire core drilling operation also becomes faster and more efficient with the aid of the rebar mode.

When core drilling system 1 detects, on the basis of correspondingly changing drilling parameters, that rebar 81 has been cut through with the aid of drill bit 50 and, subsequent thereto, only mineral material 80 is being cut into by drill bit 50 (see FIG. 5), core drilling system 1 is switched from the rebar mode back into the drilling mode. For this purpose, for example, the drilling rotational speed is increased to drilling speed and the torque generated by drive 14 and transmitted to drill bit 50 is reduced.

After drill bit 50 has either cut to the desired drilling depth in direction C into mineral material 80 or a breakthrough in mineral material 80 has been reached, the core drilling system is switched from the drilling mode into a reversing mode.

It may be determined that the desired borehole depth has been reached on the basis of reaching a predetermined threshold value for at least one corresponding predefined drilling parameter. The drilling parameters may be, for example, the feed rate of feed device 30, the rotational speed of drive 14, the rotational speed of drill bit 50, the motor amperage of drive 14, the torque generated by drive 14 and transmitted to drill bit 50, or the like. In this way, for example, it is ascertained by core drilling system 1 that a predetermined drilling depth or a breakthrough has been reached on the basis of a decreasing feed rate of feed device 30, a reduced torque of drive 14, and an increased rotational speed of drive 14 and drill bit 50.

With the aid of the reversing mode, the possibility of damaging the drill bit and/or the core drill during the removal of the drill bit out of borehole 100 may be reduced.

For this purpose, in order to adjust the core drilling system into the reversing mode, the rotational speed of drill bit 50 is adjusted to a reversing rotational speed and drill bit 50 is pulled out of borehole 100 in direction C' by feed device 30. The reversing rotational speed corresponds in this case to a multiple of the tapping rotational speed of the drill bit at the beginning of the core drilling operation. As described above, the tapping rotational speed is the rotational speed established by core drilling system 1 for drill bit 50 upon first contact with mineral material 80 and until a drilling depth of approximately 20 mm has been reached. A value for the reversing rotational speed which corresponds to a 3-fold to 4-fold multiple of the tapping rotational speed of the drill bit at the beginning of the drilling operation has proven particularly advantageous in this case. Alternatively, the reserving rotational speed may also correspond to one-half the value of the idle rotational speed.

What is claimed is:

1. A control method for the use of a core drilling system including a core drill and a feed device for driving the core drill along a machine holding device, the method comprising the following steps:
    determining an end of a core drilling operation as a function of reaching a predetermined threshold value for at least one corresponding predetermined drilling parameter; and
    selecting a reversing mode for retracting a drilling tool out of a borehole at a reversing rotational speed corresponding to a multiple of a predetermined tapping rotational speed of the drilling tool at a beginning of the core drilling operation.

2. The method as recited in claim 1 wherein the reversing rotational speed corresponds to a multiple of the tapping rotational speed.

3. The method as recited in claim 1 wherein the reversing rotational speed corresponds to a 3-fold to 4-fold multiple of the tapping rotational speed.

4. The method as recited in claim 1 wherein the reversing rotational speed corresponds to one-half the value of an idle rotational speed.

5. The method as recited in claim 1 wherein the tapping rotational speed is dependent on a diameter of the drilling tool used.

6. The method as recited in claim 1 wherein the drilling parameter corresponds to a rotational speed value of a drive of the core drill, a torque value which the drive generates and transmits to the drilling tool, or an amperage value of the drive.

7. The method as recited in claim 1 wherein the predetermined threshold value corresponds to a predetermined percentage of the corresponding drilling parameter.

8. A feed device for driving a core drill along a machine holding device according to the method as recited in claim 1.

9. A core drill for performing the method as recited in claim 1.

10. A core drilling system comprising a core drill and a feed device for driving the core drill along a machine holding device for performing the method as recited in claim 1.

11. The method as recited in claim 1 wherein the core drilling operation drills concrete.

12. The method as recited in claim 1 wherein the core drilling operation drills brickwork.

13. The method as recited in claim 1 wherein the core drilling operation leaves material in the interior of the core drill.

14. The method as recited in claim 13 wherein the material is removed together with the core drill.

15. The method as recited in claim 1 wherein the core drilling operation creates a cylindrical ring.

\* \* \* \* \*